United States Patent
Lelong et al.

(12) 
(10) Patent No.: US 6,463,540 B1
(45) Date of Patent: Oct. 8, 2002

(54) SECURING METHOD FOR COMPUTER BUS DEVICES

(75) Inventors: Stéphane Lelong, Grenoble (FR); Didier Metzen, Brignoud (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/266,190

(22) Filed: Mar. 10, 1999

(30) Foreign Application Priority Data

Nov. 3, 1998 (EP) .............................. 98402758

(51) Int. Cl.[7] .............................................. G06F 13/00
(52) U.S. Cl. ...................... 713/200; 710/200; 710/107; 710/108; 710/36; 710/37
(58) Field of Search .................... 713/200; 710/200, 710/107, 108, 36, 37, 301, 300

(56) References Cited

U.S. PATENT DOCUMENTS 5,953,511 A * 9/1999 Sescilla, III et al. ........ 710/315
6,240,477 B1 * 5/2001 Drkinger et al. ............ 710/110

\* cited by examiner

*Primary Examiner*—Ly V. Hua

(57) ABSTRACT

The invention relates to a security lock for devices connectable to a computer bus. The devices receives from the computer information as to the owner of the computer, and compares the information it receives from the bus to information regarding the legitimate owner, which is permanently stored in the device.

When the information received from the bus is different from the information stored in the device, the operation of the device is restricted.

The invention prevents use of a device on a computer other than the one of the legitimate owner. It discourages theft of the device.

15 Claims, 2 Drawing Sheets

SECURING METHOD FOR COMPUTER BUS DEVICES

FIELD OF THE INVENTION

The invention relates to the field of computers, and more specifically to the field of dynamically attachable buses for computer peripherals or devices.

BACKGROUND OF THE INVENTION

Computer peripherals or devices are often connected to the computer through specific dedicated buses—such as the LPT parallel port bus or the COM serial bus generally found on personal computers. This type of connection induces limitations on the use of the device, due to the limited performance of the specific buses, and to the fact that they are dedicated to a limited number of tasks or products. The same applies to other personal computer's input/output interfaces, such as the dedicated keyboard, mouse, and joystick interfaces.

Peripherals may also be connected to the computer with the help of a proprietary card that is inserted in the computer. In this case, communication between the card and the peripheral may follow a proprietary protocol, and is not prone to the limitations mentioned above. The drawback of such systems is that they make it necessary to open the computer casing for installing the card. In addition, the number of card slots in a given type of computer is limited.

Such interfaces do not provide plug and play functionality; in other words, installation of a peripheral involves either opening the computer for installing a dedicated card, or at least installing a specific driver. In addition, the fact that existing interfaces are dedicated to one or two specific products makes it necessary to develop a new interface any time a new product appears.

Recent buses, such as the USB (Universal Serial Bus) or the 1394 bus, propose plug and play and high capacity features. More details on USB may be found in the document Universal Serial Bus Specification. 1394 is developed under the IEEE by the 1394 Trade Association, and information on this bus may be found on the Internet Web site 1394TA.org.

These buses provide links that may be used across a wide range of PC to telephone applications. They provide the user with ease of use. They are also adapted to receive any type of peripherals, and not only a limited number of specific types of devices. In addition, they provide the user with a dynamically attachable interface, that allows any type of device to be plugged on the computer, or unplugged from the computer at any time, even when the computer is operating ("hot plug and play").

These new buses create new problems. One of the new problems addressed by the invention is the problem of theft of peripherals. Indeed, peripherals usable on a hot plug and play bus operate as soon as they are plugged on the corresponding bus, and are otherwise self supported; they do not need another component—such as a specific card or driver—to be usable. In this respect, theft of a peripheral provides the thief with a device that is directly usable on the same type of bus on another computer.

Therefore, there is a need for a method for discouraging theft of peripherals and especially of peripherals or devices usable on buses of the hot plug and play type. This is all the more important since the total cost of a device usable on such buses comprises the cost of the device itself, there being no card in the computer.

SUMMARY OF THE INVENTION

According to the invention, there is provided a device for connection to a computer bus, with
- means for storing information as to the owner of the device;
- means for comparing the owner information stored with owner information received from computer on the bus, and
- for restricting the operation of the device according to the result of the comparison.

In one embodiment of the invention, the restricting means restrict the operation of the device when the owner information received from the computer differs from owner information stored in said owner storing means.

According to a feature of the invention, the device may further comprise means for storing state information representative of a locked or unlocked state of the device.

In this case, the restricting means may restrict the operation of the device only when the state storing means store state information representative of a locked state of the device.

According to another feature of the invention, the comparing means may store in said state storing means state information received from the computer when the owner information received from the computer is identical to owner information stored in said owner storing means. The invention also provides a computer, with a bus for connecting devices, said computer comprising filter driver means for sending to a device plugged on the bus information representative of the owner of the computer. In one embodiment of the invention, said filter driver means sends said information at boot of the computer. Preferably, the bus allows dynamic device attaching, and the filter driver means sends said information when a device is attached to the bus.

In another embodiment of the invention, the filter driver means further sends to a device plugged on the bus information regarding a locking state of the device.

Preferably, the filter driver means send device unlocking information when logical removal of said device from the bus is inputted to the computer.

A computer and a device embodying the invention will now be described, by way of non-limiting example, and with reference to the attached drawings, where FIG. 1 is a state diagram of a peripheral device according to the invention;

BEST MODE OF CARRYING OUT THE INVENTION

The invention proposes to make a peripheral usable only by a dedicated user, when it is plugged on a bus. Thus, removing the peripheral from the bus of its legitimate user, and plugging of this peripheral on a similar bus on another computer does not allow the peripheral to be used. For this, the invention suggests that the peripheral only becomes active—that is usable with full functionality—after having checked the identity of its user on the bus.

Figure 1:
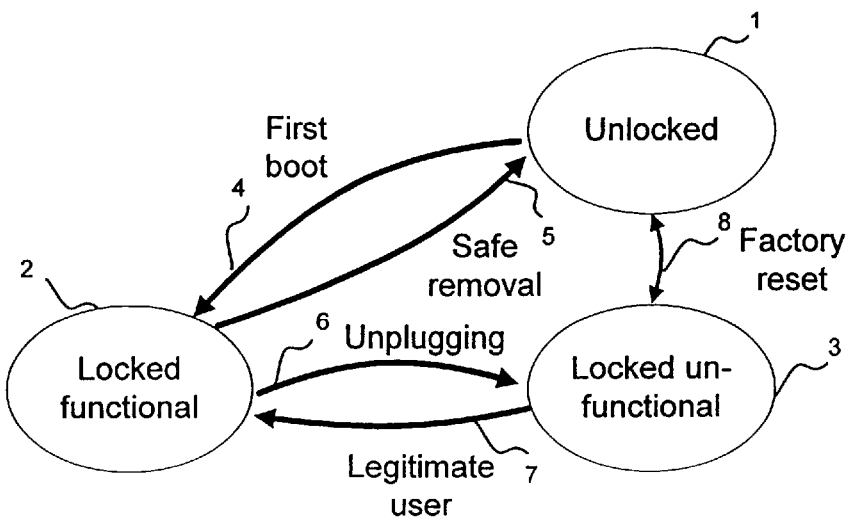

FIG. 1 shows a state diagram of a peripheral according to the invention. The peripheral may be in three different states;

the first state 1 is an unlocked state. The second state 2 is a locked and functional state. The third state 3 is a locked and unfunctional state.

In the first unlocked state 1, the peripheral may be used on any computer with full functionality. This is the state of the peripheral on the shelf. The peripheral passes from the first state to the second state, as shown by arrow 4, when plugged for the first time on a bus having a driver according to the invention; see FIG. 2 for details of the operation of the driver of the invention; it also passes from the first state to the second state at the first logon or boot of a computer having a driver according to the invention, and a bus on which the peripheral is plugged. The peripheral passes from the second state 2 to the first state 1, as shown by arrow 5, when undergoing a safe removal from the bus.

In the second state 2, the peripheral is plugged on a bus of an active computer, and is fully functional; in this state, the peripheral has identified the owner of the computer on the bus of which it is plugged as a legitimate user. It passes from the second state 2 to the third state 3, as shown by arrow 6, when it is unplugged from the bus; it also passes to the third state when at logoff or shut-down of the computer on the bus of which the peripheral is plugged. The peripheral passes from the third state 3 to the second state 2 at boot or logon of the computer on the bus of which the peripheral is plugged, if the owner of the computer is a legitimate user. It also passes from the third state 3 to the second state 2 when plugged on the bus of a computer the owner of which is a legitimate owner. This is shown by arrow 7 on FIG. 1.

In the third state 3, the peripheral is in a locked and unfunctional state, that is does not provide the user with full functionality. Nature of the locked state may vary according to the peripheral; the simplest locked state is the one where the peripheral is switched on, but refuses to execute any of the functions for which it is normally provided. The peripheral may pass from the third state 3 to the first state 1 with a factory reset, as shown by arrow 8 of FIG. 1.

The operation of a device according to the invention is explained with reference to FIG. 2 and 3.

Figure 2:
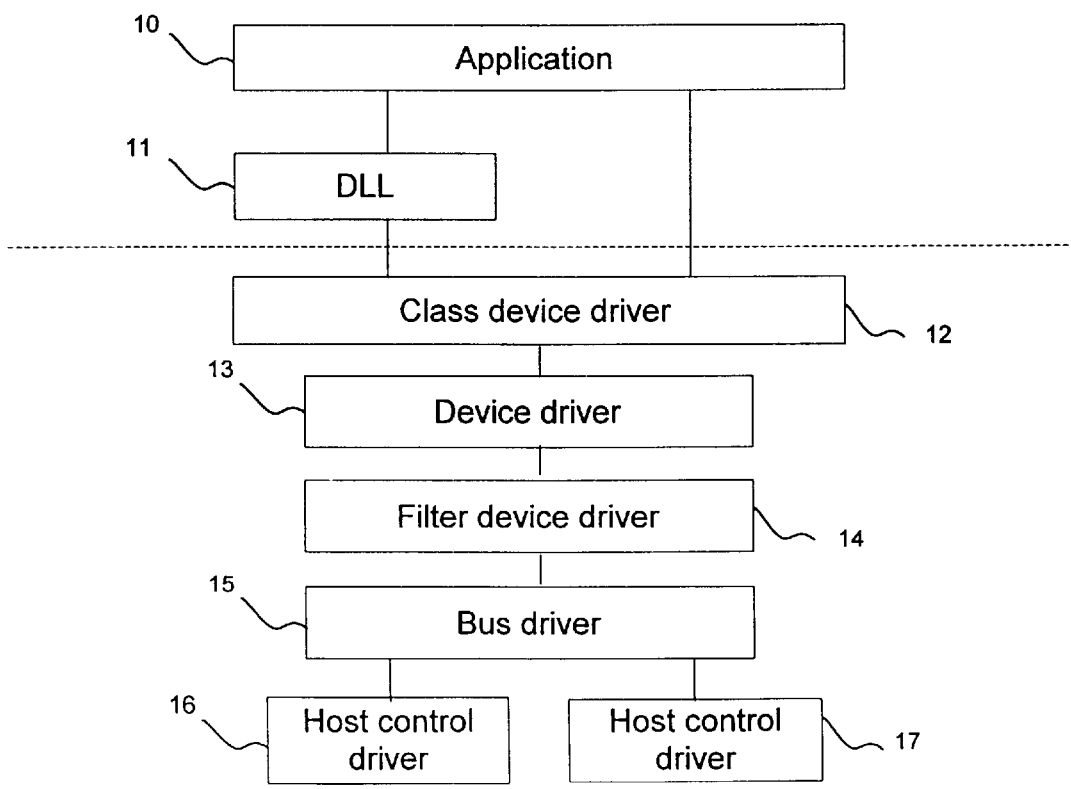
FIG. 2 is a diagrammatic representation of the logical architecture of a computer with a peripheral device embodying the invention.

FIG. 2 shows the logical arrangement of the different programs of the computer, including the filter driver according to the invention, in the case of a Microsoft Windows operating system and of a USB. On the user side, FIG. 2 shows the application 10 and the corresponding DLL 11. On the kernel side, the application and the DLL communicate with the class device driver 12; this class device driver is the USB description of the class of devices to which the peripheral belongs. Below the class device driver, one finds the device driver 13. This device driver is specific to the peripheral, and completes the information contained in the class device driver by additional information specific to the peripheral.

The filter driver 14 according to the invention is inserted below this specific device driver, and immediately above the USB driver 15.

In a way known per se, the USB driver is connected to a plurality of host controller drivers; two of these drivers 16 and 17 are represented on FIG. 2.

The structure of FIG. 2 may be obtained simply by changing the INF installation file of the corresponding peripheral, so that it loads not only the device driver, but also the filter driver of the invention. This may be done at the time the peripheral is installed, or later, by running a security application that writes the corresponding filters in the computer, and that modifies the installation files of the peripherals that have to be secured.

The operation of the driver of the invention is the following when a device is plugged on the bus, or detected on the bus. When the peripheral is plugged on the USB, it is detected at enumeration of the devices on the bus, and the corresponding drivers are loaded. If security according to the invention was installed on the computer, the installation file of the device loads not only the device driver, but also the filter of the invention.

The filter driver first obtains from the computer the identity of the owner; there are several solutions for obtaining this information. The information may be obtained at logon of the session, e. g. at Winlogon for computers using Microsoft Windows as operating system; it is sufficient in this case to provide a DLL, the purpose of which is to obtain the owner logon and the corresponding password, at the time these are inputted by the user. This solution is particularly appropriate at boot of the computer. Otherwise, and notably if a device is dynamically attached to the computer when it is operating, the owner logon may be obtained from the base of registers. It is also possible to request the user to input his identity or a password, by a prompt on the monitor screen.

Once the driver has obtained the identity of the owner, or the password, it sends this information through the bus into the relevant device. The driver also sends to the device a security activating command. Thus, a device in the first state of FIG. 1, receiving a security activating command, passes in the second state, see arrow 4 on FIG. 1. A device already in the third state of FIG. 1, that is a device that previously received a security activating command stays in the third state if the identity of the owner is not the correct one, as explained in reference to FIGS. 3 and 4. If the identity of the owner is the correct one, the device passes in the second state.

The filter driver is thereafter transparent to the operation of the device on the bus.

The filter driver is also active when the device is removed in a licit or allowed fashion; it thus allows setting of the device in the first state. At that time, the filter driver issues a security disactivating command to the device, if necessary together with the identity of the owner. Under Windows 98, one example of licit removal is the removal of the device in the "device manager" window. The same commands may be issued if the security application is uninstalled, together with the filter driver. This allows the user to have the device pass from the second state to the first state.

Figure 3:
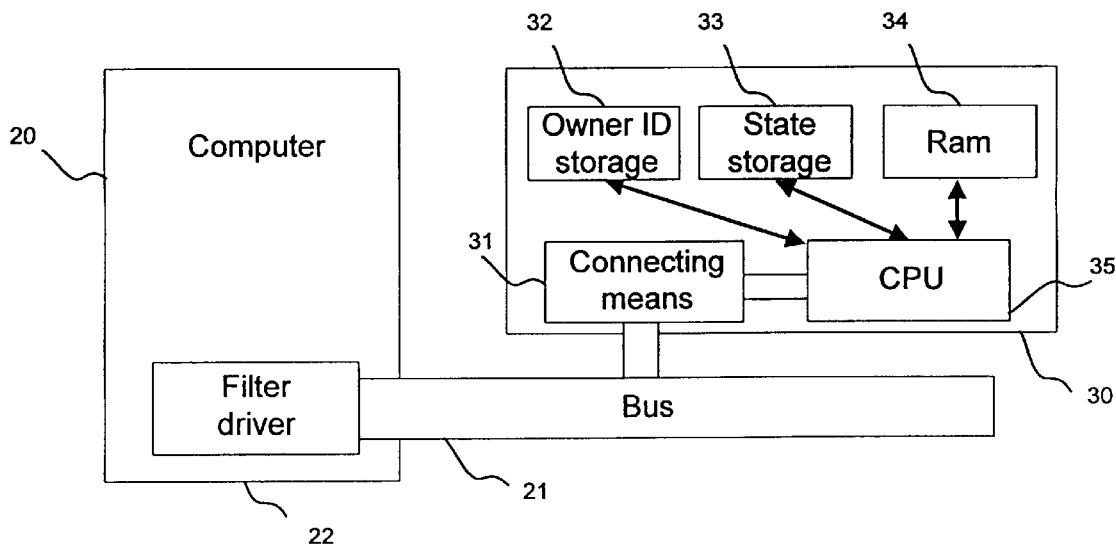
FIG. 3 is a diagrammatic representation of the structure of a computer with a peripheral device embodying the invention.

FIG. 3 is a diagrammatic representation of a computer and of a device according to the invention. The computer 20 comprises a bus 21, such as a USB, or a similar dynamically attachable bus. The computer runs a driver 22, for transmitting the owner identification to peripherals plugged on the bus. A device 30 is represented on FIG. 3.

The device 30 comprises connecting means 31 for connecting the device to a bus, such as an USB connector. the device comprises storing means 32, such as a non-volatile memory, typically an EEPROM, or part of an EEPROM, for storing the identity of the owner of the device; it further comprises means 33 for storing information representative of the locked or unlocked state of the device; these means may again comprise an EEPROM or part of an EEPROM. The device also contains storing means 34, such as a volatile memory for storing the information received on the bus from the computer.

Figure 4:
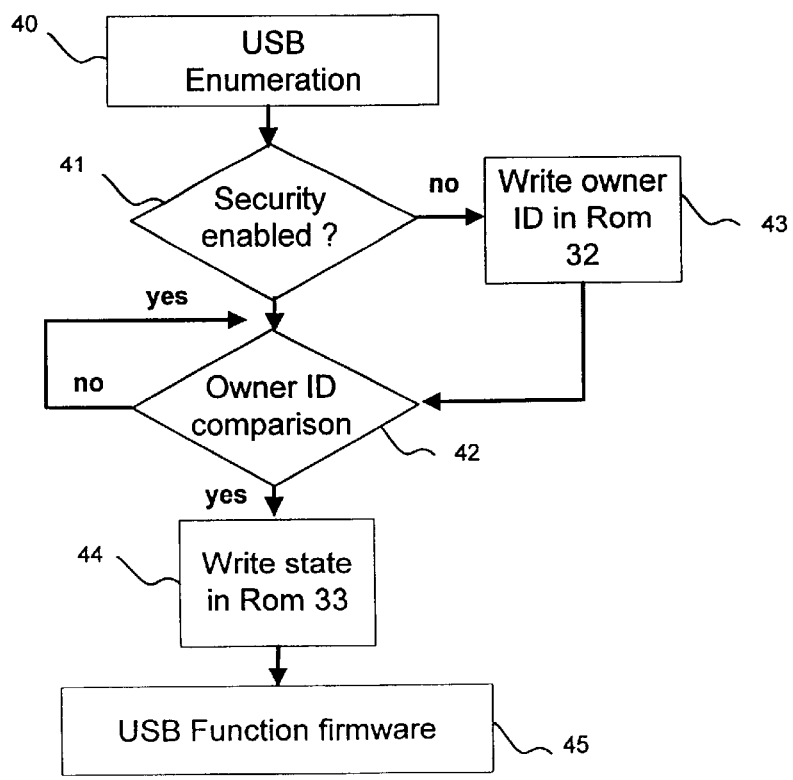
FIG. 4 is a flowchart of the operation of a peripheral device according to the invention.

The device also comprises a CPU 35; the CPU according to the invention acts as comparing means, for comparing the information stored in the device, and the information received from the computer. The CPU also acts as restricting means for restricting the operation of the device, according to the result of the comparison. FIG. 4 is a flowchart of the operation of a peripheral according to the invention. At USB enumeration at step 40, as explained above, the device may receive from the computer filter driver a security activating command together with a owner identity; this information may be stored in a volatile memory, e.g. memory 34. The firmware of the device starts by checking whether the security is enabled. This may be done by checking at step 41 the value of the non-volatile memory 33; the value stored indicates whether the device is in the first state—unlocked— or whether it is in the second or third state —locked, security activated—. If the answer is negative, the firmware passes to step 43; else, it passes to step 42.

In step 42, the device is in the second or third state; the firmware compares the legitimate owner stored in the non-volatile memory 32, with the owner received from the computer. If the comparison shows that the filter driver of the computer has sent to the device information relating to the legitimate owner, then the firmware passes to step 44.

If the comparison shows that identity of the owner is not the expected one, the firmware passes again to step 42. This may be the case if the owner information is not the correct one, or if no owner identity was received at step 40. The loop on step 42 allows identity of the owner will be checked at regular intervals. This may permit detection of a new owner, e.g. if a new session is started by the legitimate owner.

Thus, in step 42, the device stays in the third locked and unfunctional state till it receives the expected owner information.

At step 43, the firmware has determined that the device was not in a locked state. If a new owner name was received from the computer filter driver, this name is written in the non-volatile memory 32. The firmware then passes to step 44.

At step 44, the firmware has determined that the device is not in the locked state (steps 40, 41, 43), or that the device is in the locked state, but that the owner is the legitimate one (steps 40, 41, 42); the firmware may then write a new security state in the non-volatile memory 33. Thus, if the device was previously in the first or unlocked state, and if the computer filter driver sent a security activating command, the device passes to the second state; else, if the device was previously in the locked state, and if the computer filter driver sent a security disactivating command following a legitimate removal of the device, the device passes to the first state. The firmware then goes to step 45.

Step 45 is the beginning of the function firmware of the device. When this step is reached, the device is ready to provide full functionality.

The flowchart of FIG. 4 ensures the operation of the device described before: a device that is in the unlocked state may be used on any type of computer, see steps 40, 41, 43, 44, 45. If it is used with a computer where the filter driver is installed, security is activated, see step 44.

A device in a locked state may only be used with a computer having the security filter of the invention, and providing the expected owner information. See steps 40, 41, 42, 44 and 45. If the device is legitimately removed, it passes to an unlocked state. Else, if the device is simply unplugged from the bus, or if the computer is shut down, the device remains locked.

The invention thus prevents use of a device to any user but the legitimate owner of the device. These security features are provided transparently for the user, as soon as the filter driver of the invention is installed. The legitimate owner of the device may also change the locking state, and change the owner information stored in the device. This is possible in the flowchart of FIG. 4 by passing the device to the first unlocked state, and by thereafter locking the device with a different owner or user. It is also possible to provide such functions in a specific application.

As explained above, the device may be factory reset, that is passed from the third state to the first one. This may be done by providing in the device a factory password, that allows unlocking of the device.

The preferred embodiment of the invention described above is implemented on a computer running Microsoft Windows as an operating system, and having a serial bus of the USB type. The invention also applies to other types of computers or bus. The fact that the bus is a serial bus may be of interest as to the number of devices attachable to the bus; it does not affect the operation of the invention.

In the preferred embodiment, the devices may be attached dynamically to the bus. This is however not essential to the operation of the invention, which may also be carried out on a bus where the devices should be plugged before the boot of the computer.

Reference was made in the description above of the owner of a computer, and to the legitimate owner of the peripheral. The owner of a computer is declared at boot of the computer, or when a new session is started.

The owner of the peripheral according to the invention may be defined in a number of ways. The owner may be defined by the name of the person opening a session on the computer. The owner may be defined as a group on a network; the owner could also simply be a person the actual owner of the computer. The owner of the peripheral could also be defined as a person knowing a password. The owner could also be defined by a computer unique identifier, for instance the UUID provided in each PC type computer. In the case, the owner of a device is actually a machine, and the peripheral device is only usable on a specific machine.

What is claimed is:

1. A device for connection to a computer bus, with
    means for storing information as to the owner of the device;
    means for comparing the owner information stored with owner information received from computer on the bus, and for restricting the operation of the device according to the result of the comparison.

2. The device of claim 1, wherein the restricting means restrict the operation of the device when the owner information received from the computer differs from owner information stored in said owner storing means.

3. The device of claim 1, further comprising means for storing state information representative of a locked or unlocked state of the device.

4. The device of claim 3, wherein the restricting means only restrict the operation of the device when the state storing means store state information representative of a locked state of the device.

5. The device of claim 3, wherein the comparing means store in said state storing means state information received from the computer when the owner information received from the computer is identical to owner information stored in said owner storing means.

6. A computer, with a bus for connecting devices, said computer comprising filter driver means for sending to a device plugged on the bus information representative of the owner of the computer.

7. The computer of claim 6, wherein said filter driver means sends said information at boot of the computer.

8. The computer of claim 6, wherein said bus allows dynamic device attaching, and wherein said filter driver means sends said information when a device is attached to the bus.

9. The computer of claim 6, wherein said filter driver means further sends to a device plugged on the bus information regarding a locking state of the device.

10. The computer of claim 9, wherein said filter driver means send device unlocking information when logical removal of said device from the bus is inputted to the computer.

11. A device for connection to a computer bus, with
   means for storing information as to the owner of the device;
   means for storing state information representative of a locked or unlocked state of the device;
   means for comparing the owner information stored with owner information received from a computer on the bus, and for restricting the operation of the device when the owner information received from the computer differs from owner information stored in said owner storing means when the state storing means store state information representative of a locked state of the device.

12. The device of claim 11, wherein the comparing means store in said state storing means state information received from the computer when the owner information received from the computer is identical to owner information stored in said owner storing means.

13. A computer, with a bus for connecting devices that allows dynamic device attaching, said computer comprising filter driver means for sending to a device plugged on the bus information representative of the owner of the computer, wherein said filter driver means sends said information at boot of the computer when a device is attached to the bus.

14. The computer of claim 13, wherein said filter driver means further sends to a device plugged on the bus information regarding a locking state of the device.

15. The computer of claim 13, wherein said filter driver means send device unlocking information when logical removal of said device from the bus is inputted to the computer.

* * * * *